(12) United States Patent  
Griffin (10) Patent No.: US 8,966,653 B2  
(45) Date of Patent: Feb. 24, 2015

(54) METHOD AND APPARATUS FOR PROVISIONING A MOBILE APPLICATION

(75) Inventor: Dennis Eugene Griffin, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 160 days.

(21) Appl. No.: 13/452,196

(22) Filed: Apr. 20, 2012

(65) Prior Publication Data

US 2013/0283397 A1 Oct. 24, 2013

(51) Int. Cl.
*G06F 21/00* (2013.01)
*H04M 1/727* (2006.01)
*G06F 21/12* (2013.01)
*G06F 21/31* (2013.01)
*H04M 1/725* (2006.01)

(52) U.S. Cl.
CPC .............. *G06F 21/121* (2013.01); *G06F 21/31* (2013.01); *H04M 1/72527* (2013.01)
USPC ................. 726/28; 726/30; 717/174; 455/557

(58) Field of Classification Search
None
See application file for complete search history.

(56) References Cited

U.S. PATENT DOCUMENTS

| 2003/0024988 | A1* | 2/2003 | Stanard .................... 235/462.01 |
| 2007/0007329 | A1* | 1/2007 | Grovit .......................... 235/379 |
| 2009/0055467 | A1 | 2/2009 | Petersen |
| 2009/0108057 | A1 | 4/2009 | Mu et al. |
| 2010/0057674 | A1* | 3/2010 | O'Donnell ........................ 707/3 |
| 2010/0083385 | A1* | 4/2010 | Uchida ............. 726/30 |
| 2011/0213721 | A1 | 9/2011 | Raley et al. |
| 2012/0102558 | A1* | 4/2012 | Muraki .............................. 726/7 |
| 2012/0173431 | A1* | 7/2012 | Ritchie et al. .................. 705/65 |
| 2012/0254768 | A1* | 10/2012 | Aggarwal et al. ............. 715/744 |

FOREIGN PATENT DOCUMENTS

WO WO 2007/047309 A1 4/2007
WO WO 2011/075825 A1 6/2011

* cited by examiner

*Primary Examiner* — Gilberto Barron, Jr.
*Assistant Examiner* — David Le
(74) *Attorney, Agent, or Firm* — Keller Jolley Preece (57) ABSTRACT

A method and apparatus for provisioning a mobile application that is related to a desktop software application comprising capturing a code using a mobile device, where the desktop software application generates and displays the code for capture by the mobile device; decrypting the code using the mobile device; validating the code; validating a user based on the code; and enabling functionality of the mobile application for use by the mobile device based on the validation of the user.

20 Claims, 5 Drawing Sheets

METHOD AND APPARATUS FOR PROVISIONING A MOBILE APPLICATION

BACKGROUND OF THE INVENTION

1. Field of the Invention

Embodiments of the present invention generally relate to mobile applications and, more particularly, to a method and apparatus for provisioning a mobile application.

2. Description of the Related Art

Mobile devices are increasingly being used to access applications traditionally available on desktop computers. These mobile applications complement the use of desktop computers, and accordingly, the use of mobile applications is increasing. While the sale and/or purchase of desktop applications are well established, no technique currently exists that provides a means to bundle provisioning the mobile application with the sale of a desktop application. Today, when a user purchases a desktop application, a serial number is provided. During installation, the user must manually enter the serial number because the serial number is used to validate the user in the vendor's rights management system. The serial number defines the license rights and/or limits that apply to the user's license, such as a time limit or enabling of product features. In order to provision a mobile application that corresponds to an already purchased desktop application, after the mobile application is downloaded from a mobile application store, the serial number from the desktop application must be entered using the mobile device keypad. This can be cumbersome. In addition, because the serial number is a hard copy provided with the desktop application, there is a chance the serial number could be intercepted by unauthorized users. Conventional techniques are unable to provide any mechanism for user authentication and mobile application provisioning directly from the desktop application.

Therefore, there is a need for a method and apparatus for provisioning a mobile application from a desktop application.

SUMMARY OF THE INVENTION

The present invention provides a method and apparatus for provisioning a mobile application that is related to a desktop software application. In one embodiment the method comprises capturing a code using a mobile device, where the desktop software application generates and displays the code for capture by the mobile device. The mobile device decrypts and validates the code. If the code is found to be valid, a user is validated based on the code and functionality of the mobile application is enabled for use by the mobile device based on the validation of the user.

While the method and apparatus is described herein by way of example for several embodiments and illustrative drawings, those skilled in the art will recognize that the method and apparatus for provisioning a mobile application is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for provisioning a mobile application as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention comprise a method and apparatus for provisioning a mobile application. The invention bundles mobile application provisioning directly with the desktop application. In some embodiments, the mobile application may be downloaded directly from the mobile application store. The mobile application has no functionality or limited functionality until the mobile application is provisioned. The desktop application generates a code containing a packet of data necessary to provision the mobile application. The code is displayed on the desktop and may be photographed with a camera on the mobile device or otherwise transferred to the mobile device. The code is then decrypted on the mobile device. The decrypted packet of data includes user information, account information and application information. The features and functionality of a previously purchased desktop application are hereafter referred to as "licensed rights", which rights are included in one or more of the user information, account information or application information. Next, the code itself is verified to ensure the code is valid. If the code is valid, the decrypted information is used to ensure the user is authorized to use the mobile application. Once validation is complete, the mobile application is provisioned on the mobile device with the appropriate user rights, unlocking the paid functionality, thereby turning the downloaded mobile application into a fully functioning application.

Various embodiments of an apparatus and method for provisioning a mobile application are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the present invention provide a method and apparatus for provisioning a mobile application from a desktop application. Advantageously, embodiments provide a simple encrypted code generated from a desktop application for validating and provisioning the mobile application directly on the mobile device. The code is displayed for one-time-usage with limited time access to ensure the code cannot be shared by unauthorized users.

Figure 1:
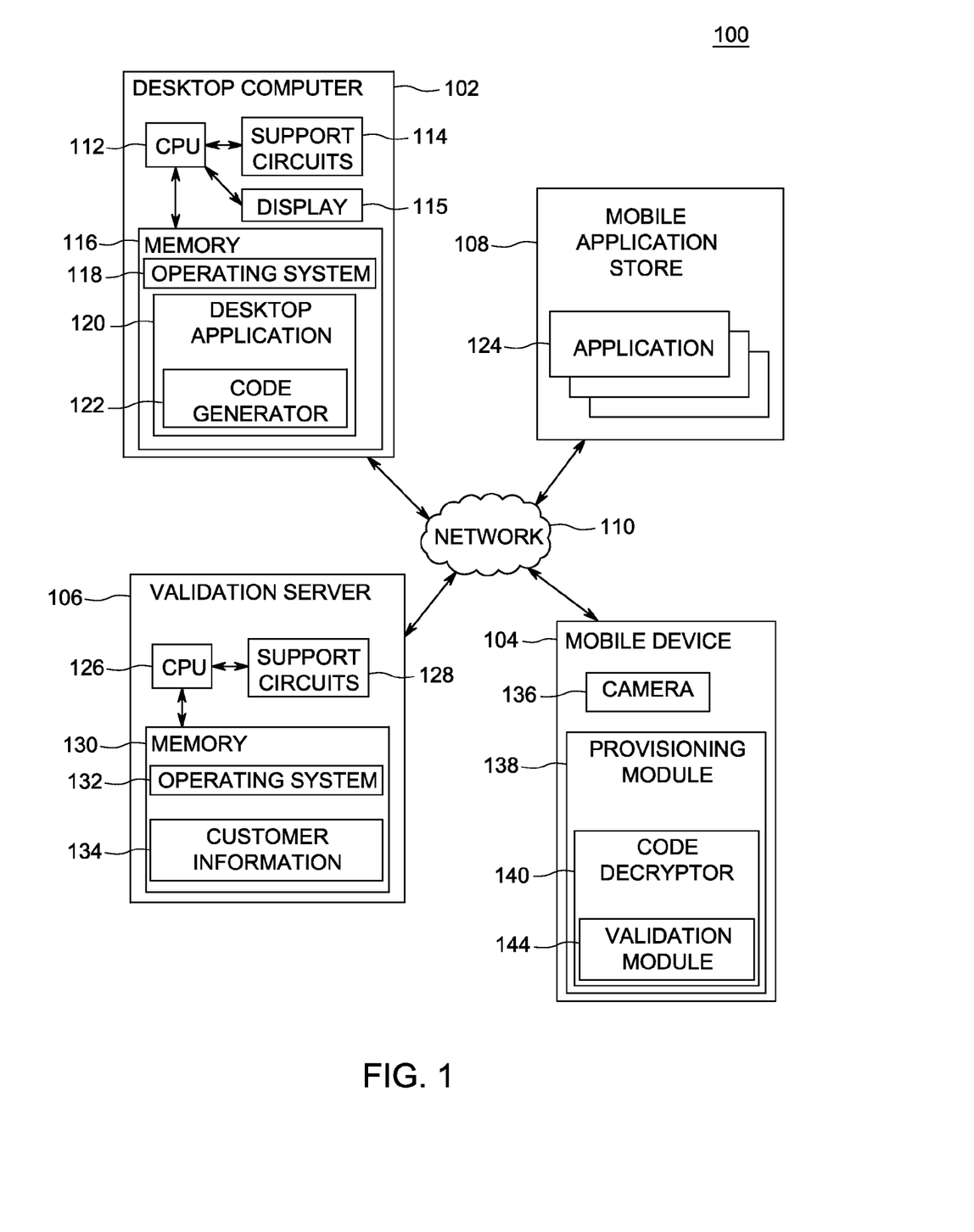
FIG. 1 depicts a block diagram of a system for provisioning a mobile application, according to one or more embodiments.

FIG. 1 is a block diagram of a system 100 for provisioning a mobile application, according to one or more embodiments of the invention. The system 100 bundles mobile application provisioning with a desktop application. The system 100 includes a desktop computer 102 including a display 115, a mobile device 104, a validation server 106, and a mobile application store 108, each coupled to the other through a network 110. A desktop application 120 generates and displays a code for capture by the mobile device 104. The mobile device 104 captures and decrypts the code. The code itself is validated and if the code is found to be valid, a user is validated based on the code. Once validated, functionality of the mobile application is enabled on the mobile device based on the validation of the user.

According to some embodiments, the validation server 106 is a type of computing device (e.g., a laptop, a desktop, a Personal Digital Assistant (PDA), a tablet, a mobile phone and/or the like) known to one of ordinary skill in the art. The validation server 106 includes a Central Processing Unit (CPU) 126, support circuits 128, and a memory 130. The CPU 126 may include one or more commercially available microprocessors or microcontrollers that facilitate data processing and storage. The various support circuits 128 facilitate the operation of the CPU 126 and include one or more clock circuits, power supplies, cache, input/output circuits, and/or the like. The memory 130 includes at least one of Read Only Memory (ROM), Random Access Memory (RAM), disk drive storage, optical storage, removable storage and/or the like. The memory 130 includes an operating system 132, and customer information 134.

The mobile application store 108 may be hosted on a server, and enables the user to purchase one or more mobile applications, such as an application 124.

The network 110 includes a communication system that connects computers by wire, cable, fiber optic and/or wireless link facilitated by various types of well-known network elements, such as hubs, switches, routers, access points and the like. The network 110 may employ various well-known protocols to communicate information amongst the network resources. For example, the network 110 may be a part of the Internet or Intranet using various communications infrastructure, such as Ethernet, Wi-Fi, Wi-Max, General Packet Radio Service (GPRS), and the like.

The desktop computer 102 is a type of computing device (e.g., a laptop, a desktop, and/or the like) known to one of ordinary skill in the art. The desktop computer 102 includes a Central Processing Unit (CPU) 112, support circuits 114, and a memory 116. The CPU 112 may include one or more commercially available microprocessors or microcontrollers that facilitate data processing and storage. The various support circuits 114 facilitate the operation of the CPU 112 and include one or more clock circuits, power supplies, cache, input/output circuits, and the like. The memory 116 includes at least one of Read Only Memory (ROM), Random Access Memory (RAM), disk drive storage, optical storage, removable storage and/or the like. The memory 116 includes an operating system 118, and a desktop application 120. The desktop application 120 includes a code generator 122.

According to some embodiments, the operating system (OS) 118 generally manages various computer resources (e.g., network resources, file processors, desktop application, code generator and/or the like). The operating system 118 is configured to execute operations on one or more hardware and/or software modules, such as Network Interface Cards (NICs), hard disks, virtualization layers, firewalls and/or the like. For example, the desktop application 120, the code generator 122, the desktop application 120 call commands associated with the operating system 118 (i.e., native operating system commands) to perform various operations, such as generating codes, accessing the desktop application and/or the like.

The code generator 122 generates a code by encrypting data specific to the desktop application 120 that is necessary to provision the mobile application. As a security measure, the code may be a one-time-use code that is time-limited, thereby requiring the mobile application to be provisioned before the code expires. The encrypted data may define user identity information, as well as functionality and features (hereafter also referred to as "licensed rights") purchased by the user for the desktop application 120. In some embodiments, the code is a quick response (QR) code, a 2-dimensional bar code, a serial number, a text string, and/or the like. After code generation, the desktop application 120 displays the QR code to the user of the desktop computer 102.

In some embodiments, the mobile device 104 is a type of computing device (e.g., a Personal Digital Assistant (PDA), a tablet, a mobile phone and/or the like) known to one of ordinary skill in the art. The mobile device 104 includes a camera 136, and a provisioning module 138. The provisioning module 138 includes a code decryptor 140. The code decryptor 140 includes a validation module 144.

The mobile device 104 receives the QR code from the desktop computer 102. According to some embodiments, the mobile device 104 utilizes one or more techniques for receiving the code generated at the desktop computer 102. In some embodiments, the camera 136 of the mobile device 104 is used to take a snapshot of the QR code on the desktop device 102, as explained in FIG. 4. Those skilled in the art will appreciate various other means for receiving the QR code or equivalent on the mobile device 104, for example, by using a bar code scanner feature of the mobile device, or a Bluetooth communication or other near field communication link.

Upon receipt of the QR code on the mobile device 104, the code decryptor 140 of the provisioning module 138 decrypts the QR code. In some embodiments, the code decryptor 140 utilizes some hash techniques or other related decrypting algorithms to decrypt the encrypted QR code. The code decryptor 140 decrypts the code containing a packet of data including user information, account information, and mobile application information and/or the like.

After decrypting the code, the code itself and the decrypted data are validated. In some embodiments, the validation module 144 of the code decryptor 140 performs the validation on the mobile device 104. In other embodiments, the code decryptor 140 sends the data to the validation server 106 for validation. The information sent to the validation server 106 may include a serial number of the application, a current date/time, user account information and other related information useful for validation.

The validation server 106 receives the information from the mobile device 104. The code itself is validated to ensure it has not expired and has not been previously used. The validation server 106 then validates the user information by accessing customer information 134. In one embodiment, the customer information 134 may contain information about a company's software licensing rights with a list of employees, referred to here as "users", who may have access to those rights. The user information will be validated against the customer information file 134. The validation server 106 verifies if the user is authorized to provision the application 124. The customer information 134 may also include licensing information associated with the user's desktop application 120. During validation, the licensing information will be used to determine whether the user's license has expired or define what product features will be provisioned for the user on the mobile device 104. The user information must match the information in the customer information file in order for the validation server 106 to determine that the user is a valid user. The validation server 106 sends the validation results to the validation module 144 of the mobile device 104.

If the validation module 144 determines that the user is authorized, then the code decryptor 140 provisions the mobile application 124, enabling functionality per the validation results.

Figure 2:
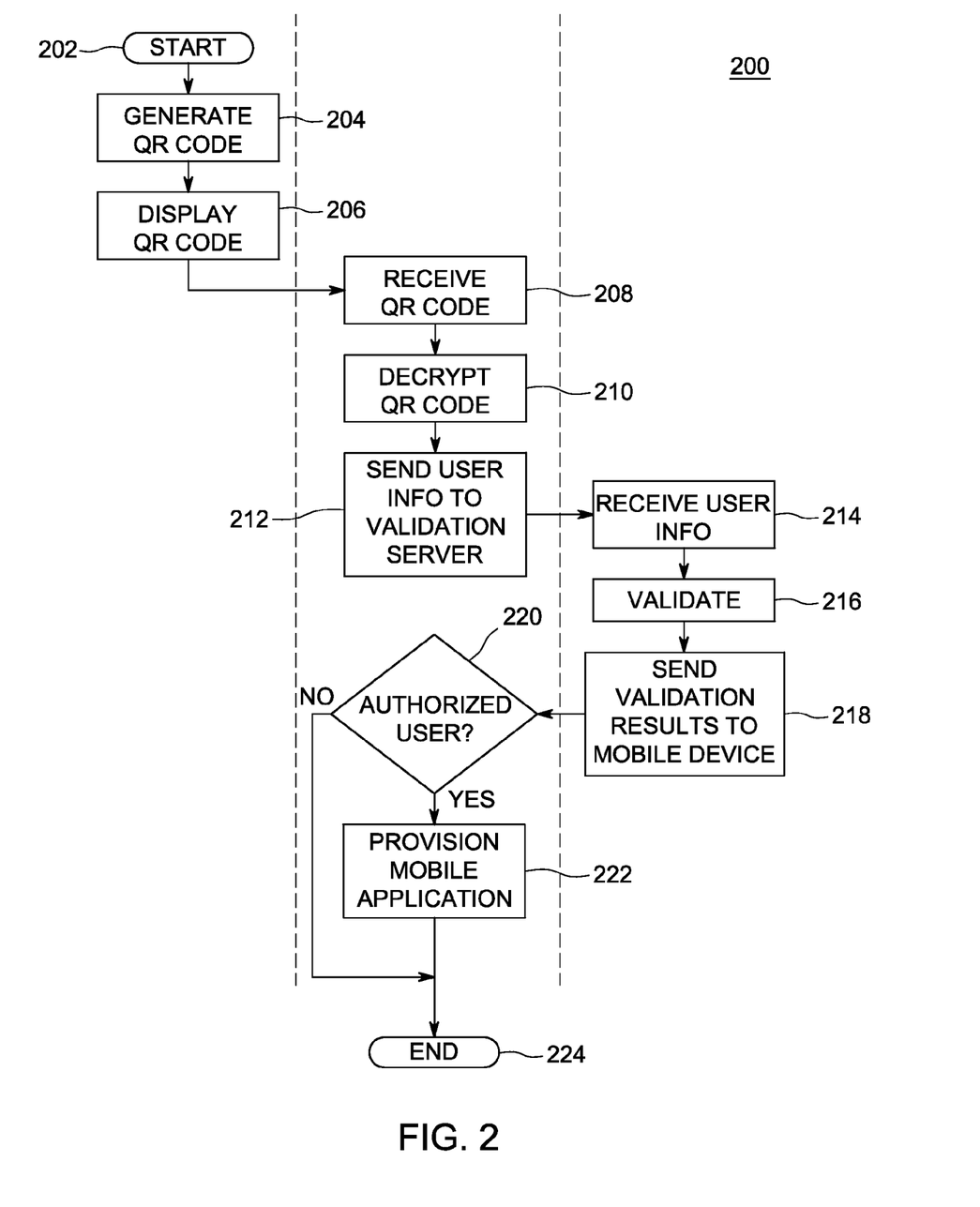
FIG. 2 depicts a flow diagram of a method for provisioning a mobile application as performed by the provisioning module of FIG. 1, according to one or more embodiments.

FIG. 2 is a flowchart of a method for provisioning a mobile application performed by the provisioning module 138 of FIG. 1, according to one or more embodiments of the invention. The method 200 receives the QR code generated by the desktop application, decrypts the code, validates the information provided in the code, and if valid, provisions the mobile application on the mobile device with one or more features of the application as per the validation results.

The method 200 starts at step 202 and proceeds to step 204. At step 204, a QR code is generated by the desktop application and displayed on the desktop computer. The code generator of the desktop application encrypts a packet of user data including a unique product serial number, customer information, configuration information, and any other information that may be necessary to provision the mobile application. In some embodiments, the code is a one-time-use code for provisioning the mobile application and is time-limited. In some embodiments, the code may be a quick response (QR) code, a 2-dimensional bar code, a serial number, a text string, and/or the like. The method 200 proceeds to step 206. At step 206, the QR code is displayed on the desktop computer. The method 200 proceeds to step 208.

Figure 4:
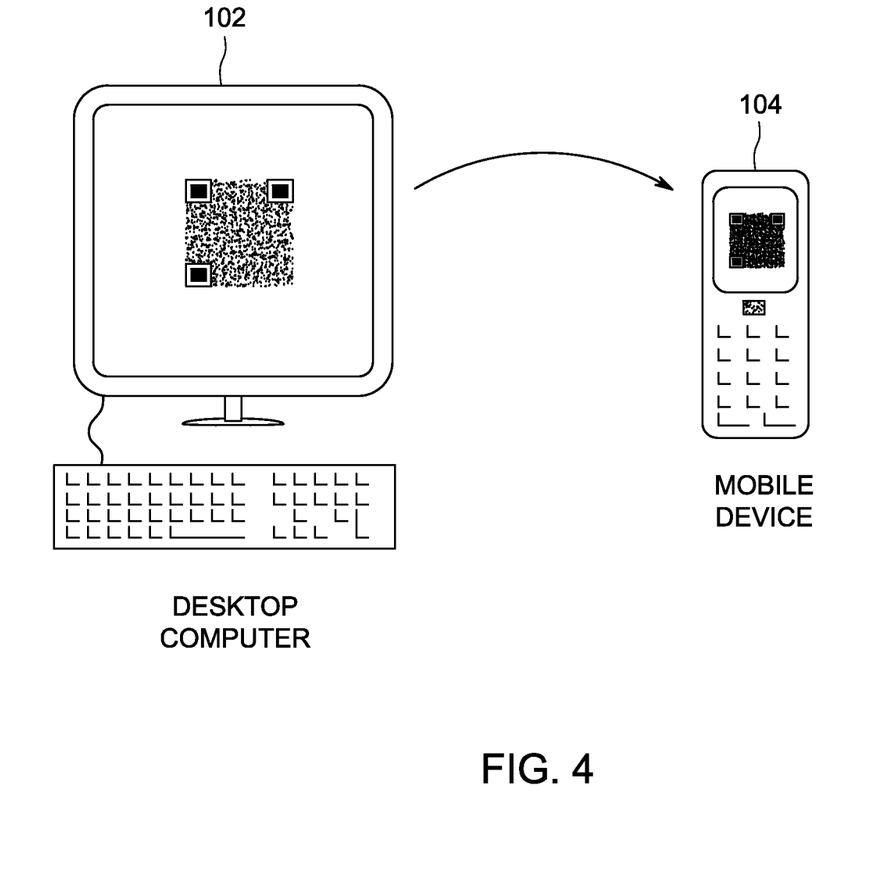
FIG. 4 depicts a quick response (QR) code generated on a desktop computer and transferred to a mobile device for processing as performed by the system of FIG. 1, according to one or more embodiments.

At step 208, the QR code is received on the mobile device. In some embodiments, the camera of the mobile device takes a snapshot of the QR code on the desktop device as depicted in FIG. 4. Although the current invention describes using a camera to take a snapshot of the QR code, one skilled in the art would appreciate various means of transferring the QR code to the mobile device. The method 200 proceeds to step 210. At step 210, the QR code is decrypted. The code decryptor decrypts the QR code, providing the packet of user data, which will be used for validation and provisioning. The method 200 proceeds to step 212.

At step 212, user data is sent to a validation server. In some embodiments, the validation module on the mobile device performs the validation. In other embodiments, the validation module sends the decrypted user data to the validation server for validation. The user data may include a serial number of the application, a current date/time, user information, license information, and other information useful for validation and/or the like. The method 200 proceeds to step 214.

At step 214, the user data is received on the validation server. The method 200 proceeds to step 216. At step 216, the validation server validates the code itself and verifies the user is authorized to access the mobile application as described further in FIG. 3. In one embodiment, the code is a one-time-use code and time limited. During validation, the validation server will ensure the code has not been used previously and that it is still active. If the code proves to be invalid, the validation server will not validate the user. The user will need to return to their desktop application and request that a new code be created.

The method 200 proceeds to step 218. At step 218, the validation results are sent to the mobile device. The validation results include whether the user is authorized to download the application and may include licensing information retrieved from the customer information on the validation server defining what features of the application the user has purchased. The method 200 proceeds to step 220.

At step 220, a determination is made whether the user is authorized based on the validation results. If the user is not authorized, the method 200 proceeds to step 224 and ends. If, at step 220, the user is authorized, the method 200 proceeds to step 222. At step 222, the code decryptor provisions the mobile application on the mobile device enabling one or more features of the application 124 as per the validation results. The method 200 proceeds to step 224 and ends.

Figure 3:
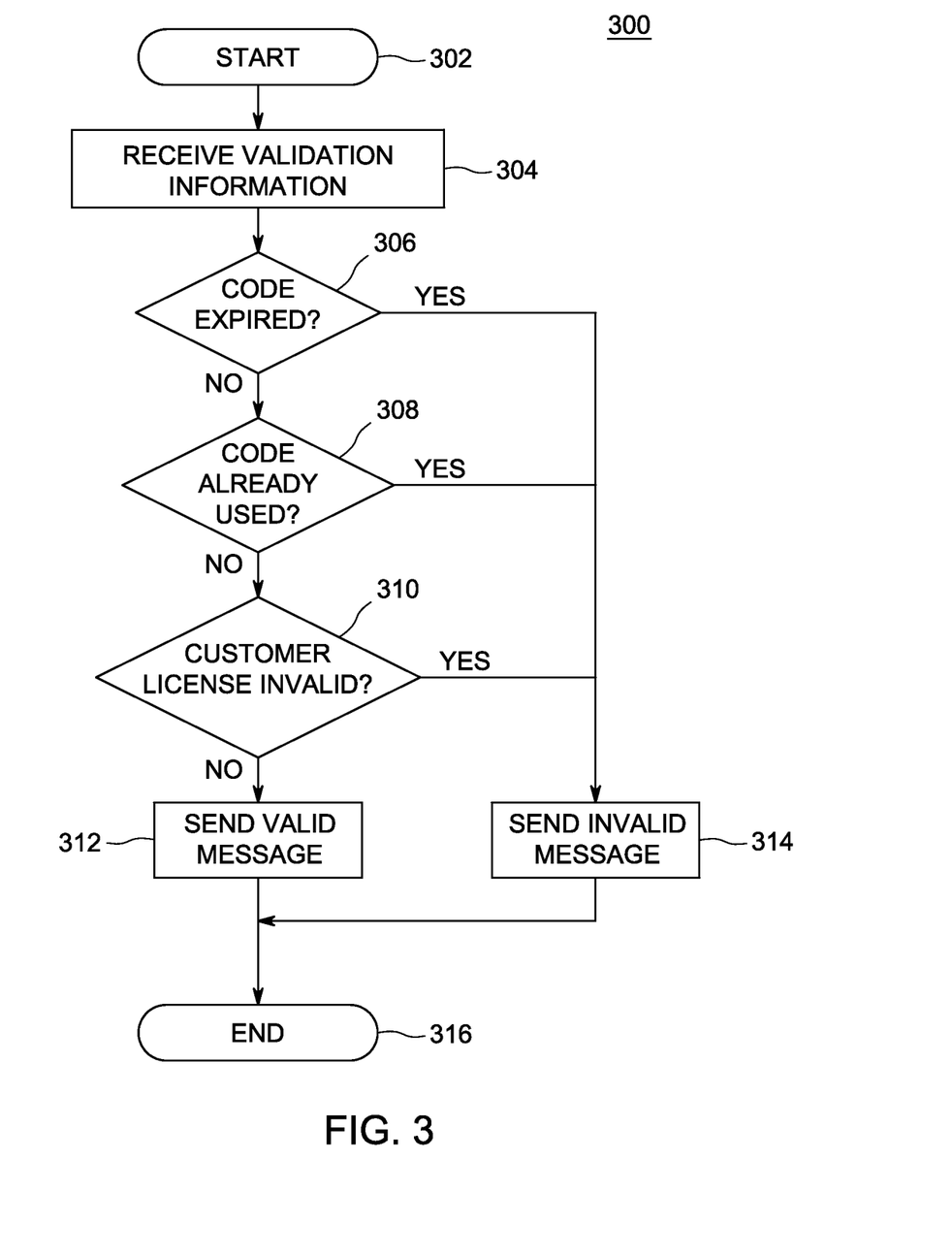
FIG. 3 depicts a flow diagram of a method for validating information as performed by the validation server of FIG. 1, according to one or more embodiments.

FIG. 3 is a flowchart of a method for validating information as performed by the validation server 106 of FIG. 1 and shown generally as step 216 in FIG. 2. The method 300 validates the QR code itself, and then validates the user.

The method 300 begins at step 302 and proceeds to step 304. At step 304, the method 300 receives validation information. Information regarding validation may include a serial number of the desktop application, the current date/time, and other information that may be used in the validation. The method 300 proceeds to step 306. At step 306, the method 300 determines whether the QR code has expired. If the QR code is a time-limited code and the time for using the QR code has expired, the mobile application cannot be provisioned. In such a case, a new QR code will need to be generated by the desktop application and the process repeated. If at step 306, the method 300 determines the QR code has expired, the method 300 proceeds to step 314.

If at step 306, the method 300 determines the QR code has not expired, the method 300 proceeds to step 308. At step 308, the method 300 determines whether the QR code has already been used to provision a mobile application on a mobile device. The QR code may only be used once to ensure the mobile application is provided free to the purchaser of the desktop application only and is not used to provide a free mobile download to an unauthorized user who has gained access to the QR code. If, at step 308, the method 300 determines the QR code has already been used to provision a mobile application on a mobile device, the method 300 proceeds to step 314. If, at step 308, the method 300 determines the QR code has not been used to provision a mobile application on a mobile device, the method 300 proceeds to step 310.

At step 310, the method 300 determines whether the customer is allowed the full use of functionality of the mobile application. The method 300 looks at the customer information on the validation server to determine whether the user's license for the application is still valid and what product features are enabled. If at step 310, the method 300 determines the user of this mobile device is not a valid user for the mobile application, the method 300 proceeds to step 314. If, at step 310, the method 300 determines the user of this mobile device is a valid user for the mobile application, the method 300 proceeds to step 312.

At step 312, the method 300 returns a valid message. The method 300 proceeds to step 316 and ends. If the method 300 proceeded to step 314 from step 306, 308, or 310, the method 300 returns an invalid message. The method 300 proceeds to step 316 and ends.

FIG. 4 depicts a quick response (QR) code generated on a desktop computer and transferred to a mobile device. A QR code is generated on the desktop computer and then displayed on the I/O device, such as monitor, screen, etc. In some embodiments, the QR code may be a 2-dimensional graphical bar code or a text string.

Once the code is displayed on the desktop, a camera of the mobile device is used to take a snapshot of the QR code from the screen of the desktop computer. In some embodiments, the camera of the mobile device takes an image of the QR code from the desktop device. As previously noted, those skilled in the art may utilize other means for receiving the QR code from the desktop device onto the mobile device for processing. On receiving the QR code, the mobile device decrypts the QR code and sends the decrypted information to a validation server for further processing.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 5:
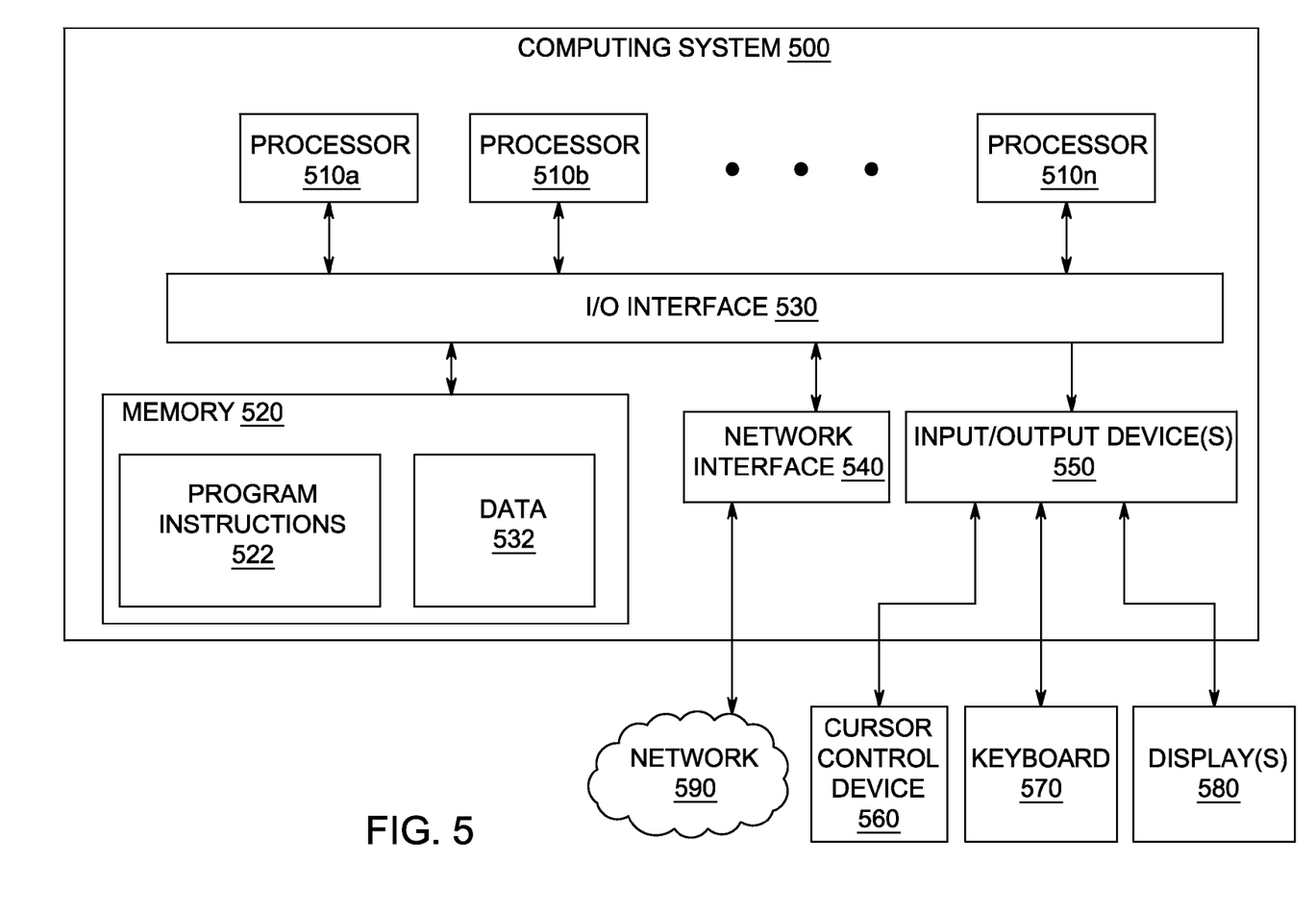
FIG. 5 depicts a computer system that can be utilized in various embodiments of the present invention, according to one or more embodiments.

FIG. 5 depicts a computer system that can be utilized in various embodiments of the present invention to implement the mobile device, the mobile application store, the desktop computer and/or the validation server, according to one or more embodiments.

Various embodiments of method and apparatus for provisioning a mobile application, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement methods described above. The computer system 500 may be used to implement any other system, device, element, functionality or method of the above-described embodiments. In the illustrated embodiments, computer system 500 may be configured to implement method 200 and method 300, as processor-executable executable program instructions 522 (e.g., program instructions executable by processor(s) 510) in various embodiments.

In the illustrated embodiment, computer system 500 includes one or more processors 510 coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of components may be utilized by the system to receive user input described above. In various embodiments, a user interface (e.g., user interface) may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs), such as the x96, PowerPC, SPARC, or MIPS ISAs, or any other suitable ISA. In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 540, In some embodiments, I/O interface 530 may perform any necessary protocol, timing or other data transformations to convert data signals from one components (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example.

Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the methods described above, such as the methods illustrated by the flowcharts of FIGS. 2 and 3. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method for provisioning a mobile application that is related to a desktop software application comprising:
   capturing a code using a mobile device, where the desktop software application generates and displays the code on a desktop device, wherein the code corresponds to license rights of a user to use the desktop software application;
   decrypting and validating the code using the mobile device;
   retrieving validation results for the user based on the code, wherein the validation results comprise authorization to use one or more mobile application features; and
   enabling functionality of the mobile application for use by the mobile device based on the validation results of the user, wherein the enabled functionality corresponds to the one or more mobile application features, wherein the mobile application is a software application running on the mobile device and not on the desktop device, and wherein the mobile application is a mobile version of the desktop software application running on the desktop device.

2. The method of claim 1, wherein the code is a 2-dimensional graphical bar coded format.

3. The method of claim 1, wherein the code is a text string.

4. The method of claim 1, wherein decrypting the code comprises providing user information, account information, and mobile application information.

5. The method of claim 1, wherein the code defines functionality purchased by the user for a desktop application.

6. The method of claim 1, wherein validating the code comprises verifying the code has not expired and verifying the code has not been previously used.

7. The method of claim 1, further comprising validating the user by verifying an existing license for the user.

8. A system for bundling mobile application provisioning of a mobile application that is related to a desktop software application with the desktop software application comprising:
   a computer having one or more processors coupled to a system memory and further comprising:
      a desktop software application, the desktop software application comprising a code generator for generating a code on a desktop device, wherein the code corresponds to license rights of a user to use the desktop software application; and
      a code decryptor for (i) reading the code, (ii) decrypting the code, (iii) retrieving validation results for the user based on the code, wherein the validation results comprise authorization to use one or more mobile application features, and (iv) enabling functionality of the mobile application based on the validation results, wherein the enabled functionality corresponds to the one or more mobile application features, wherein the mobile application is a software application running on the mobile device and not on the desktop device, and wherein the mobile application is a mobile version of the desktop software application running on the desktop device.

9. The system of claim 8, further comprising a validation server for validating a user based on the code, wherein the validation server receives user information, account information, and mobile application information from the code decryptor.

10. The system of claim 8, wherein the code is at least one of a 2-dimensional graphical bar coded format or a text string.

11. The system of claim 8, wherein the code decryptor decrypts the code to provide user information, account information, and mobile application information for validation.

12. The system of claim 11, wherein the user information defines licensing terms for the user.

13. The system of claim 8, wherein code decryptor verifies the code has not expired and verifies the code has not been previously used.

14. The system of claim 8, wherein the code decryptor sends user and account information to a validation server for validation.

15. A non-transitory computer readable medium for storing computer instructions that, when executed by at least one processor cause the at least one processor to perform a method for provisioning a mobile application that is related to a desktop software application comprising:
   capturing a code using a mobile device, where the desktop software application generates and displays the code on a desktop device for capture by the mobile device wherein the code corresponds to license rights of a user to use the desktop software application;
   decrypting and validating the code using the mobile device;
   retrieving validation results for the user based on the code, wherein the validation results comprise authorization to use one or more mobile application features; and enabling functionality of the mobile application for use by the mobile device based on the validation results of the user, wherein the enabled functionality corresponds to the one or more mobile application features, wherein the mobile application is a software application running on the mobile device and not on the desktop device, and wherein the mobile application is a mobile version of the desktop software application running on the desktop device.

16. The computer readable medium of claim 15, wherein the code is a 2-dimensional graphical bar coded format.

17. The computer readable medium of claim 15, wherein the code is a text string.

18. The computer readable medium of claim 15, wherein decrypting the code comprises providing user information, account information, and mobile application information.

19. The computer readable medium of claim 15, wherein validating the code comprises verifying the code has not expired and verifying the code has not been previously used.

20. The computer readable medium of claim 15, further comprising validating the user by sending user and account information to a validation server for validation.

* * * * *